United States Patent [19]
Tiwari et al.

[11] Patent Number: 5,477,228
[45] Date of Patent: Dec. 19, 1995

[54] DIFFERENTIAL GLOBAL POSITIONING SYSTEM USING RADIO DATA SYSTEM

[75] Inventors: Anil Tiwari, Palo Alto; Lynn Weber, Saratoga; Ronald P. Haley, Los Altos Hills, all of Calif.

[73] Assignee: Differential Corrections Inc., Cupertino, Calif.

[21] Appl. No.: 42,491

[22] Filed: Apr. 13, 1993

[51] Int. Cl.$^6$ .............................. H04B 7/185; G01S 5/02
[52] U.S. Cl. ............................................ 342/357; 455/12.1
[58] Field of Search ............................ 342/357; 455/12.1

[56] References Cited

U.S. PATENT DOCUMENTS

| | | | |
|---|---|---|---|
| 4,751,512 | 6/1988 | Longaker | 342/357 |
| 5,311,194 | 5/1994 | Brown | 342/357 |
| 5,323,322 | 6/1994 | Mueller et al. | 342/357 |

*Primary Examiner*—Theodore M. Blum
*Attorney, Agent, or Firm*—Patrick T. King

[57] ABSTRACT

Differential correction signals for a global positioning system (GPS), which operates with signals from a plurality of orbiting satellites, are provided in a first standard format, such as a RTCM SC-104 format, for each satellite in view of a reference receiver station. The differential correction signals include range error correction signals and range rate error correction information. The differential correction signals are then encoded according to a second standard format, such as the RDS format. The transmission time of the signals in the second standard format are then prioritized. A broadcast transmitter, such as a broadcast FM transmitter, is then modulated by the prioritized signals in the second standard format and a receiver receives and demodulates the broadcast signal. The broadcast prioritized signals in the second standard format are then decoded to provide differential correction signals in the first standard format. Various prioritization schemes are provided such as: prioritizing according to the maximum range acceleration rate for the various satellites; prioritizing according to the range acceleration rate for the various satellites exceeding a predetermined absolute value; prioritizing according to range error correction signals exceeding a predetermined absolute value; and prioritizing according to the range error or acceleration corrections signals for the various satellites. In addition to prioritizing, the RTCM signals is compressed and a ⅛ minute time clock is used to simplify processing at a user receiver.

33 Claims, 4 Drawing Sheets

DIFFERENTIAL GLOBAL POSITIONING SYSTEM USING RADIO DATA SYSTEM

BACKGROUND OF THE INVENTION

1. Field of the Invention

This invention relates to Global Positioning Systems (GPS) and, more particularly, to techniques for providing differential range error information and range-rate error information.

2. Prior Art

The Global Positioning System (GPS) is a navigation system consisting of a constellation of 24 satellites in 6 orbital planes that provides accurate 3-dimensional position and velocity information as well as precise time to users anywhere in the world 24 hours a day. Each of the Satellites transmits on the same L-band frequencies (1575.42 MHz for the Standard Positioning Service) using independent Psuedo Random Noise codes for spread spectrum modulation. Satellite data includes system status, ephemeris and clock characteristics and is NRZ modulated onto the satellite carrier at 50 bits/sec.

User receivers measure their apparent range to the satellites by processing the received signals to determine transit time and correcting for atmospheric delay using stored and broadcast models. Since the location of the satellites, at the time of signal transmission, is known from the broadcast ephemeris the location of the receiver can be triangulated from the range measurements. The receiver's local clock error can be eliminated from the solution by incorporating one more satellite's range measurement than the number of dimensions being solved.

Similarly the receiver's velocity can be solved by comparing the measured Doppler shift of the received signals to the expected Doppler shift based on the satellites velocity vector, calculated from the ephemeris and projected on the line of sight to the satellite. After the user receiver's clock error is eliminated, by over determination, the residual Doppler is attributed to the user velocity.

Differential GPS offers the potential of accuracy's of 2–10 meters for dynamic applications and better than 2 meters for static applications. By placing a reference receiver at a precisely surveyed location and comparing measured GPS satellite ranges with ranges predicted by the satellite data transmissions, errors in the measurements can be computed. The errors in range and range rate are provided to a GPS receiver using errors signals encoded using the Recommended Standards for Differential Navstar GPS Service published by the Radio Technical Commission for Maritime Services (RTCM) Special Commitee No. 104. The Standard is called the RTCM SC-104 Standard.

This differential correction technique is effective only if the dominant error sources are receiver independent. For GPS users that are in reasonably close proximity the error sources are primarily selective-availability errors, atmospheric-delay errors and satellite-data errors. Selective Availability is a technique used by the Department of Defense that introduces artificial errors at the satellite for strategic reasons. DOD authorized users have access to keys that enable them that remove these error completely. Ionospheric and Tropospheric delays vary with the time of day, atmospheric conditions and Satellite elevation angle. Errors in the satellite's transmitted ephemeris and clock characteristics contribute to range measurement error. These error sources are all independent of the user's receiver and can be considered as common mode errors.

Under the RTCM SC-104 Standard, the error message structure for each satellite is 53 bits long. The RTCM system transmits all of the satellite data. Eight satellites in view of a reference receiver requires a data rate of approximately 400 bits/sec. for a system operating under the RTCM SC-104 Standard The RTCM SC-104 Standard uses sixteen bits for pseudo range correction. Eight bits are used for range rate correction. One bit is used for a scale factor. Thirteen bits are used for a time tag which provides 0.6 second increments for an hour period. Five bits are used for identification of a particular satellite. Eight bits are used for an Issue of Data (IODE) batch number. Two bits are used for a receiver station's estimate of the differential range error.

Information under the RTCM SC-104 Standard typically uses a transmitter which broadcast information over a relatively large area. For commercial broadcast transmitters, use of an auxiliary data channel with a data rate of 400 bits/sec. is relatively expensive. Consequently the need has arisen for a technique to economically and efficiently transmit differential GPS error information at a lower data rate, while still maintaining accuracy.

REFERENCES

1 ICD-GPS-200, Navstar GPS Space Segment/Navigation User Interfaces, 30 Nov. 1987, GPS Joint Program Office, Los Angeles, Calif.
2 RTCM Recommended Standards for Differential Navstar GPS Service, Version 2.0, 1 Jan. 1990, Radio Technical Commission For Maritime Services, Washington, D.C.
3 Specification of the Radio Data System (RDS), EN50067, April 1992, CENELEC, Brussels, EBU, Geneva
4 United States RBDS Standard, Draft. no. 1.9, 17 Jul. 1992, NRSC Document

SUMMARY OF THE INVENTION

It is an object of the invention to provide a technique for economically and efficiently broadcast transmitting differential error information for a DGPS system.

In accordance with this and other objects of the invention, a system provides differential correction signals for a global positioning system (GPS) which operates with signals from a plurality of orbiting satellites. Differential correction signals are provided in a first standard format, such as a RTCM SC-104 format, for each satellite in view of a reference receiver station. The differential correction signals in the first standard format are then encoded according to a second standard format, such as the RDS format. The transmission time of the signals in the second standard format are then prioritized. A broadcast transmitter, such as a broadcast FM transmitter, is then modulated by the prioritized signals in the second standard format. A receiver receives and demodulates the broadcast signal. The broadcast prioritized signals in the second standard format are then decoded to provide differential correction signals in the first standard format.

The differential correction signals include range error correction signals and range rate error correction information.

Various prioritization schemes are provided such as: prioritizing according to descending order for range acceleration for the various satellites; prioritizing according to the range acceleration for the various satellites exceeding a predetermined absolute value; prioritizing according to range error correction signals exceeding a predetermined absolute value; and prioritizing according to the range error corrections signals for the various satellites.

Additional features of the invention includes: compression of the data and times bits of a RTCM signals, use of a ⅛ minute time clock; a lower data rate; and sending RTCM TYPE 2 and TYPE 9 messages instead of redundant RTCM TYPE 1 messages The invention provides a method for receiving information from a plurality of Global Positioning System (GPS) satellites and for rebroadcasting a selected portion of this information for receipt by selected recipients. The method comprising the steps of: providing a GPS receiver/processor to receive GPS signals from K GPS satellites, consecutively numbered k=1, 2, ..., K (K≧2); providing a transmitter connected to the GPS receiver/processor to rebroadcast selected GPS signals in each of a sequence of time intervals given by $t_i < t < t_{i+1}$, for receipt by selected recipients; and using the transmitter to rebroadcast selected GPS signal range information received from satellite number k0 at a selected time t in the time interval $t_i < t < t_{i+1}$, where satellite number k=k0 is chosen according to a criterion based upon the range errors $e_{i,k}$ and the range error rates $v_{i,k}$ and range error accelerations $a_{i,k}$ at the sequence of times $\{t_i\}_i$ for each of the satellites k=1, 2, ..., K.

According to one aspect of the invention, the method of the invention provides that the criterion for choice of the satellite number k0 is that $|a_{i,k0}| = \max_{1 \leq k \leq K}\{|a_{i,k}|\}$. The accelerations above a certain threshold are ranked in descending order and the highest ranked is sent first.

The invention provides that the criterion for choice of the satellite number k0 is determined as follows: determining a first range error for satellite number k at a selected time t in said time interval $t_i < t < t_{i+1}$ by the relation $e_{i,k}(t) = e_{i,k}(t_i) + (t - t_i) v_{i,k}(t_i)$; determining a second range error for satellite number k at the selected time by the relation $e_{i,k}'(t) = e_{i-1,k} + (t - t_{i-1}) v_{i-1,k}(t_i \, < t < t_{i+1})$; for the selected time t, forming a difference $e_{i,k} = e_{i,k}(t) - e_{i,k}'(t)$ and comparing the magnitude $|e_{i,k}|$ with a selected threshold e>0; and transmitting the present range information for all satellite numbers k for which $|e_{i,k}| \geq e$.

The invention also provides that the criterion for choice of the satellite number k0 is determined as follows: determining a first range error for satellite number k at a selected time t in a time interval $t_i < t < t_{i+1}$ i by the relation $e_{i,k}(t) = e_{i,k}(t_i) + (t - t_i) v_{i,k}(t_i)$; determiniing a second range error for satellite number k at the selected time t by the relation $e_{i,k}'(t) = e_{i-1,k}(t_{i-1}) + (t - t_{i-1}) v_{i-1,k} (t_{i-1}) \, (t_i < t < t_{i+1})$; for the selected time t, forming a difference $e_{i,k} = e_{i,k}(t) - e_{i,k}'(t)$ and comparing the magnitudes $|e_{i,k}|$; rearranging the magnitudes $|e_{i,k}|$, for i fixed, in descending order as a sequence $e_{i,k1} \geq |e_{i,k2}| \geq |e_{i,k3}| \geq \ldots \geq |e_{i,kK}|$; and for at least one pair of consecutive integers m and m+1 (1≦m≦K−1), transmitting the present range information for satellite number km before transmitting said present range information for satellite k=k(m+1).

The method further comprising the steps of: comparing the magnitudes $|e_{i,k}|$ with a selected threshold e>0; and transmitting the present range information only for satellite numbers k for which $|e_{i,k}| \geq e$. Range or acceleration errors above a certain threshold are ranked in descending order from highest to lowest and the highest ranked are sent first.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
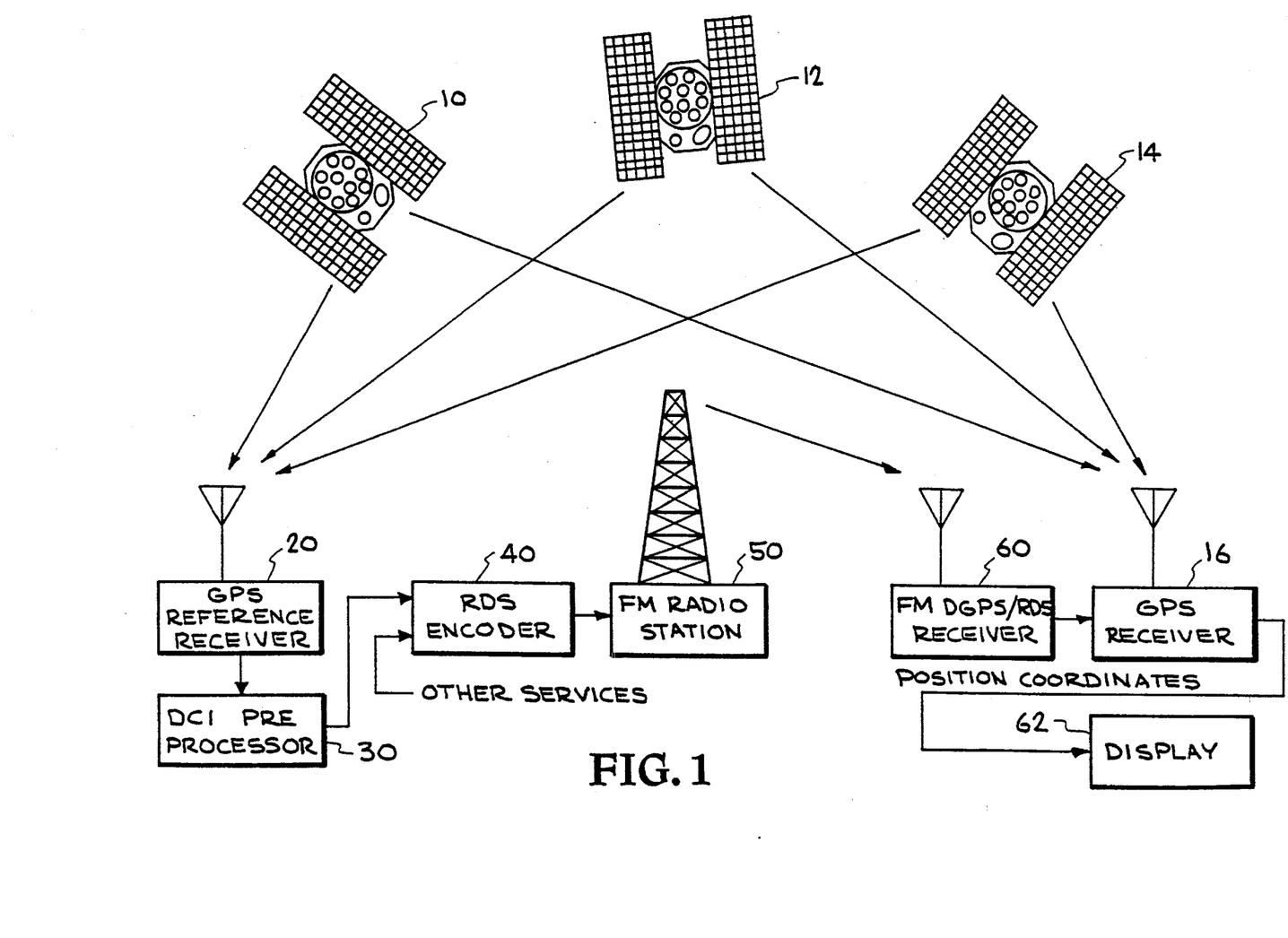
FIG. 1 is a block diagram of a global positioning system combined with a radio data system for providing differential error signals to the global positioning system.

FIG. 1 shows a block diagram of a Global Positioning System (GPS) combined with a radio data system for providing differential error signals to the global positioning system. The GPS is a navigation system which includes 24 satellites m(typically shown as 10, 12, 14) in 6 orbital planes.. These satellites provide accurate 3-dimensional position and velocity information, as well as precise time information, to users anywhere in the world 24 hours a day. Each of the satellites transmits on the same L-band frequency at 1575.42 MHz for a Standard Positioning Service using independent psuedo-random-noise codes as a spread. spectrum modulation signal. The satellite data includes various information such as system status, ephemeris, and clock characteristics. The data is NRZ modulated at 50 bits/sec.

A GPS receivers (typically shown as reference numeral 16) measures its apparent range to the various satellites by processing the received signals from each of the various satellites in its view. The received signals are used to determine transit time (range) and to correct for atmospheric delay using stored and broadcast models. Since the location of the satellites at the time of signal transmission is known from a broadcast ephemeris, the location of the receiver 16 can be calculated by triangulation from various range measurements. The effect of errors in the receiver's local clock can be eliminated from the calculation by incorporating an additional range measurement from a satellite, where the number of satellites required for this calculation is one more than the number of dimensions being solved.

Similarly, the velocity of the receiver can be solved by comparing the measured Doppler shift of its received signals to the expected Doppler shifts based on the velocity vectors of the various satellites. Where the velocity vectors are calculated from the ephemeris and are projected on the various lines of sight to the respective satellites. After the receiver's clock error is eliminated, by over determination, the residual Doppler is attributed to the user velocity.

Differential GPS accuracy of 2–10 meters for dynamic applications and better than 2 meters for static users. As mentioned previously, this differential error technique is effective only if the dominant error sources are receiver independent. For GPS users that are in reasonably close proximity, the sources of error are primarily selective availability errors, atmospheric delay errors, and satellite data errors. Selective availability is a technique used by the Department of Defense that introduces artificial error at the satellite for strategic reasons. DOD authorized users have access to keys that enable them that remove these error completely. Atmospheric delay errors include ionospheric and tropospheric delays, which vary with the time of day, atmospheric conditions, and satellite elevation angles. Satellite data errors include errors in a satellite's transmitted ephemeris and clock characteristics, which contribute to range measurement errors. These various types of errors are all independent of the user's receiver.

For a differential correction system, a GPS reference receiver 20 is placed at a precisely surveyed location. By comparing measured GPS satellite ranges with ranges predicted by the satellite data transmissions, errors in the measurements can be computed and provided as differential corrections for range and range-rate, or velocity, information.

The GPS differential reference receiver 20, terrain permitting, tracks all satellites above a 2 degree elevation mask. The differential reference station 20 is located at a local broadcast radio station studio, a transmitter site, or another location centered in a broadcast coverage area. The reference receiver 20 calculates and outputs differential GPS correction signals in RTCM format at a once per second rate to a preprocessor 30. The antenna for the reference receiver is typically surveyed to sub-meter accuracy.

RTCM messages according to the SC-104 standard have a number of formats. A Type 1 message contains data for all satellites in view of the reference station. Forty bits are required for each satellite, so that four hundred bits are required to be sent in a Type 1 RTCM message for eight satellites. A Type 2 message contains the differences in the pseudorange and Range rate corrections caused by a change in a sites navigation data. A Type 9 message is identical in format to a Type 1 message with the exception that the information is selected so that information for individual satellites is selectively sent. The system according to the invention primarily uses Type 2 and Type 9 messages to send prioritized information about the individual satellites.

Table 1 shows a comparison between an RTCM SC-104 message and the system according to the invention (designated as the DCI/RDS/DGPS system). Note that the RTCM system uses 8 bits for pseudo range correction while the invention uses 6 bits.

The preprocessor 30 reformats the RTCM DGPS data to be compatible with a RDS system message format and prioritize the messages to achieve the best possible accuracy at the available data rate. The age of the DGPS corrections, as delivered to the GPS receiver, will vary from 1 to several seconds depending on the characteristics of the individual satellite signals.

The output signals of the preprocessor 30 are provided as input signals to on input terminal of a RDS encoder 40. The RDS-encoded signals are then provided to the modulation-input-signal terminal of a FM broadcast transmitter 50.

The RDS (radio data system) system is a data system which has been implemented by the BBC on all BBC FM transmissions in England. Similar systems are available in several European countries under a EBU Standard. An RDS subcarrier at 57 kHz is modulated with data signals. The baseband coding for the RDS system includes a group of 104 bits which is comprised of four blocks of 26 bits each. All blocks have a 16-bit information word and a 10-bit check word. The RDS system has a number of message group types. A Group Type 4A message is for clock time and date information. A Group Type 6A message is for In-House data. Group Type 6A messages are used for data in a system according to the present invention.

The data rate for the RDS system is 1187.5 bits/second or approximately 11.4 groups/second. Since systems like the RDS system have broad coverage, a number of users can use a data channel on a pro-rata basis. To be economical, it is important that messages be limited. The present invention uses only 50 bits/sec of a RBS channel, which is considerable less than the 400 bits/sec. required by the RTCM system. It has been found that prioritizing messages according to the invention, as described herein, provides sufficient accuracy for a DGPS system without requiring transmission of satellite information once per second.

The broadcast signal is received at a DGPS/RDS receiver 60. If the receiver 60 is a mobile FM broadcast receiver, it will scan for a FM broadcast radio station transmitting RDS with the DGPS service. The RDS data is decoded and reformatted to provide the DGPS corrections. The DGPS data is output in RTCM format as 1200 baud serial data at TTL levels to be compatible with either 3.3 or 5 volt logic.

TABLE 1

Differential GPS Message Structures

| | Message Length | Pseudo Range Correction | | Range Rate Correction | | Scale Factor | Time Tag | PRN | IODE | UDRE |
|---|---|---|---|---|---|---|---|---|---|---|
| | | Range (m) | Resolution | Range (m) | Resolution | | | | | |
| RTCM SC-104 | 53 Bits | 16 Bits | | 8 Bits | | 1 Bit | 13 Bits | 5 Bits | 8 Bits | 2 Bits |
| DCI/RDS/DGPS | 35 Bits | ±10485.76 | 0.320 | ±4.096 | 0.032 | 1 | 3 Bits | 5 bits | 8 Bits | 2 Bits |
| | | ±655.36 | 0.020 | ±0.256 | 0.002 | 0 | | | | |
| | | 10 Bits | | 6 Bits | | 1 Bit | | | | |
| | | ±655.36 | 1.280 | ±2.048 | 0.064 | 1 | | | | |
| | | ±81.92 | 0.160 | ±0.512 | 0.016 | 0 | | | | |

The RTCM system uses 13 bits ( one second increments in an hour) for a time tag. The present invention uses only 3 bits for a time tag. The invention uses ⅛ minute time increments within a minute and updates the clock every one minute. This saves 10 bits of RDS data and simplifies computation at a receiver.

It is also possible to output the DGPS corrections in a more compact format than RTCM to reduce communications and computation overhead, if desired. The output signals of the GPS receiver provide corrected position coordinates to a display device 62.

Timing for a system according to the invention is provide in 1/8th minute intervals, which determines a time slot. Time within a time slot is measured with a Zcount variable. The results in nor time projection calculations being required and eliminates the need for multipliers or dividers at a receiver. The present invention projects all data to the beginning of one of its 1/8th minute time slots. Data is then kept current to within a 3 or 4 seconds.

DGPS output data is preferably provided as RTCM SC-104 type 9 messages. This provides the best performance and the most robust solution in difficult environments because a missed message has less impact on a GPS solution than does a missed type 1 message.

The preprocessor 30 uses GPS time as delivered by the GPS reference receiver 20 to control timing of the RDS-DGPS message. The RDS/DGPS receiver 60 uses GPS time to tag the output RTCM type 9 message's "Z-count." Time synchronization from the reference receiver to the type 9 output is better than 1 second.

Each RDS/DGPS receiver 60 is individually serialized at the time of manufacture. Subscribers subscribe to a differential corrections service by calling with their receiver I.D. and prepaying to cover a certain period of time and for a predetermined service level. A paid-up receiver is then activated via a paging message.

RTCM messages are provided over a 2-wire unidirectional serial data port at TTL levels.

The RDS/DGPS receiver outputs RTCM Type 1, Type 2, and Type 9 messages. Type 2 messages are provided after a change in satellite navigation data as provided in the RTCM specification. Serial data is delivered at 1200 baud with 8 data bits, 1 stop bit and no parity.

GPS time is used at the base station to time the RDS/DGPS messaging system and thus passed to the RDS/DGPS receiver to set the "Z-count" of the output RTCM messages. This time will be held to within 1 second throughout the system.

Operation of the preprocessor 30 and the DGPS/RDS receiver 60 are under software control, implemented in a laboratory version as a C-code program on a PC compatible personal computer and in a production version as a 4-bit microcontroller.

Figure 2:
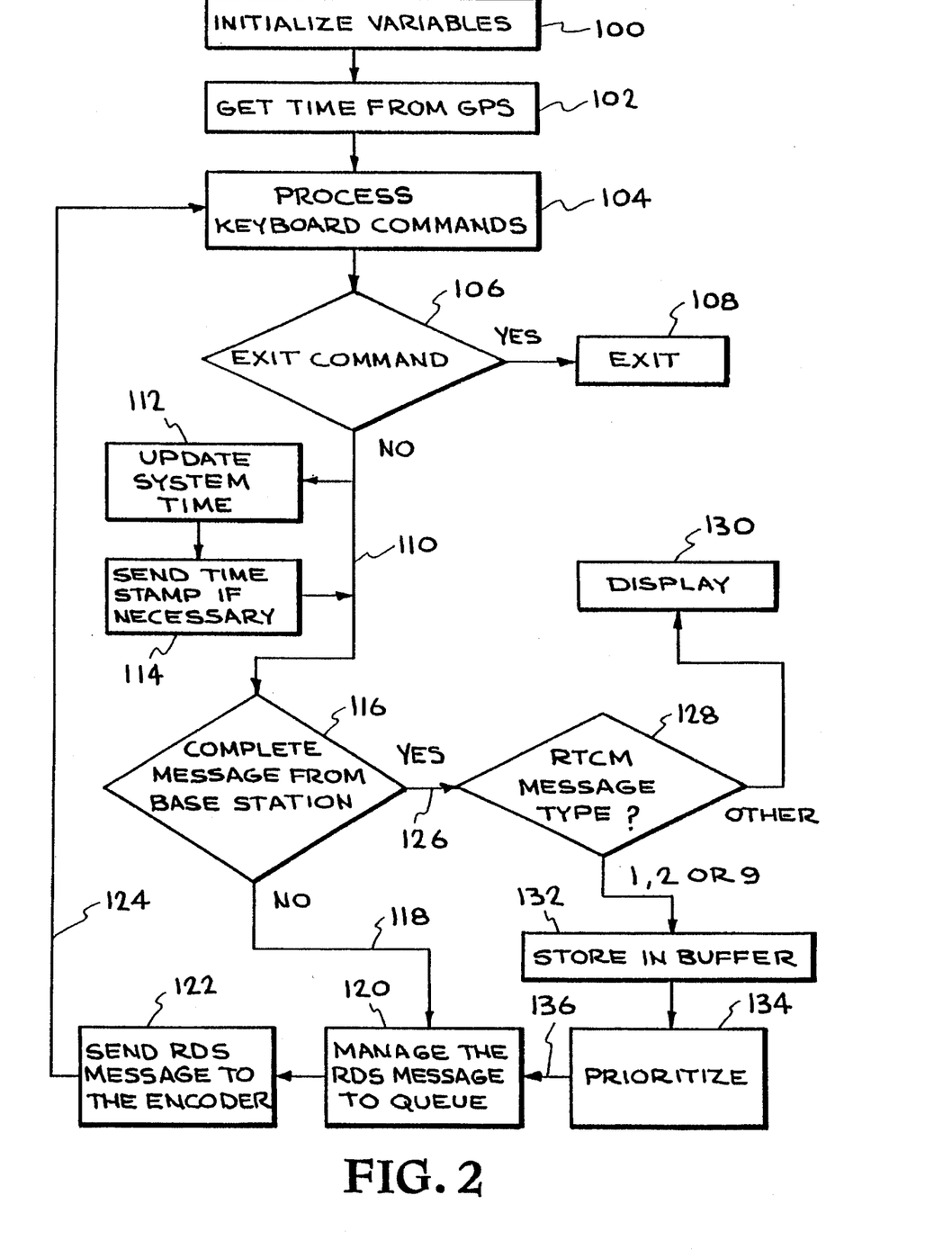
FIG. 2 is a flow chart showing the operation of a differential corrections transmitter.

FIG. 2 is a flow chart showing the program operation for a differential corrections transmitter at a base station having a reference receiver. This operation provides for conversion of RTCM-104 information to RDS information, which is held in a RDS queue prior to broadcast transmission through the RDS system to a receiver via, for example, a broadcast radio transmitter.

The program starts by initializing variables, as indicated in process block 100. The program proceeds in block 102 to get GPS time from the GPS system.

A main control loop starts with a block 104 which checks for and processes keyboard commands from a personal computer keyboard or a keypad. A decision block 106 scans the keyboard data for an exit command. If such a command is received, the system proceeds to an exit function, as indicated by a block 108. If no such command is received, the system continues on a path 110. Every minute, the system time is updated as indicated by the block 112. As indicated by the block 114 a routine is invoked which transmits a RDS type 4A clock-time and date group, or time stamp. This time stamp is sent once every minute just before the next minute rollover so the information really applies to the start of the next minute.

A decision block 116 tests whether a complete message has been sent from the reference, or base station, receiver.

If a complete message is not received from the reference, or base station, receiver, the program continues of path 118 to a block 120 which manages the existing message queue for the RDS system. The program then send a RDS message to the encoder, as indicated in block 122. The system then loops back on the path 124 to the block 104 which continues to check for and process keyboard commands.

If a complete message is received from the reference, or base station, receiver, the program proceeds on a path 126 to a decision block 128 which determines the type of completed RTCM message to be processed.

If other than a RTCM message type 1, 2, or 9 is to be processed, that message is sent to be displayed as indicated by block 130.

If a RTCM message type 1, 2, or 9 is to be processed, that type 1, 2, or 9 message is stored in a buffer, as represented by the block.

Block 134 identifies a block which prioritizes the transmission sequence for the various messages sent through the RDS system. Various prioritization criteria are used as described herein. After prioritization, the program proceeds on a path 136 to manage the RDS message queue.

Figure 3:
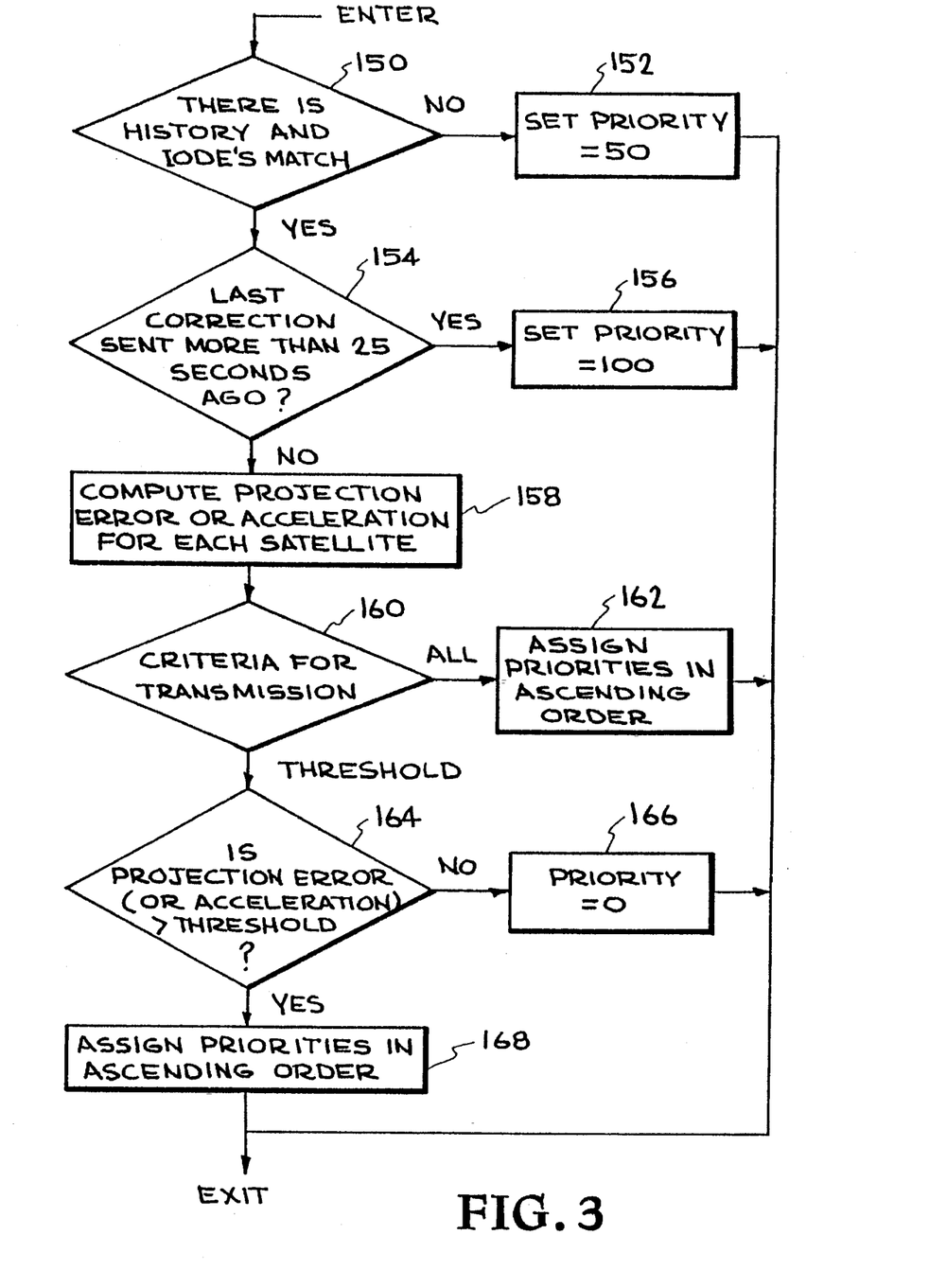
FIG. 3 is a flow chart showing the prioritization flow for a differential corrections transmitter.

FIG. 3 is a more detailed program flow chart showing the prioritization function for a differential corrections transmitter.

After this routine is entered, a decision block 150 tests whether there is a history of a new message to be added to the RDS queue and if the IODE's for the messages match. If not, priority is set to 50 on a scale of 100, as indicated in block 152, and the program exits back to the RDS queue management routines shown in block 120 of FIG. 2.

If there is history and the IODE's for the messages match, the routine continues to another decision block 154 which tests whether the last correction for a satellite was sent more than 25 seconds ago because the GPS system wants GPS data which is less than 25 second old. If the last correction for a satellite was sent more than 25 seconds ago, priority for that message is set to 100, the highest priority value, as indicated by the block 156.

If the last correction for a satellite was sent less than 25 seconds ago, the routine proceeds to a block 158 which computes data for each satellite, including projected range and range-rate error as well as an acceleration value for each satellite.

The routine continues to a decision block 160 which tests the computed data according to various criteria. If data for all satellites is to be transmitted, the routine proceeds to a block 162 which assigns priorities in ascending order. If thresholds for the data are to be used, the routine proceeds to a decision block 164 which test whether either projection errors or acceleration errors are to be tested as exceeding predetermined thresholds. If the respective projection or acceleration threshold is not exceeded, the satellite is given a 0 priority value, as indicated by the block 166. If the respective projection or acceleration threshold is exceeded, the routine proceeds to a block 168 which assigns priorities in ascending order.

Figure 4:
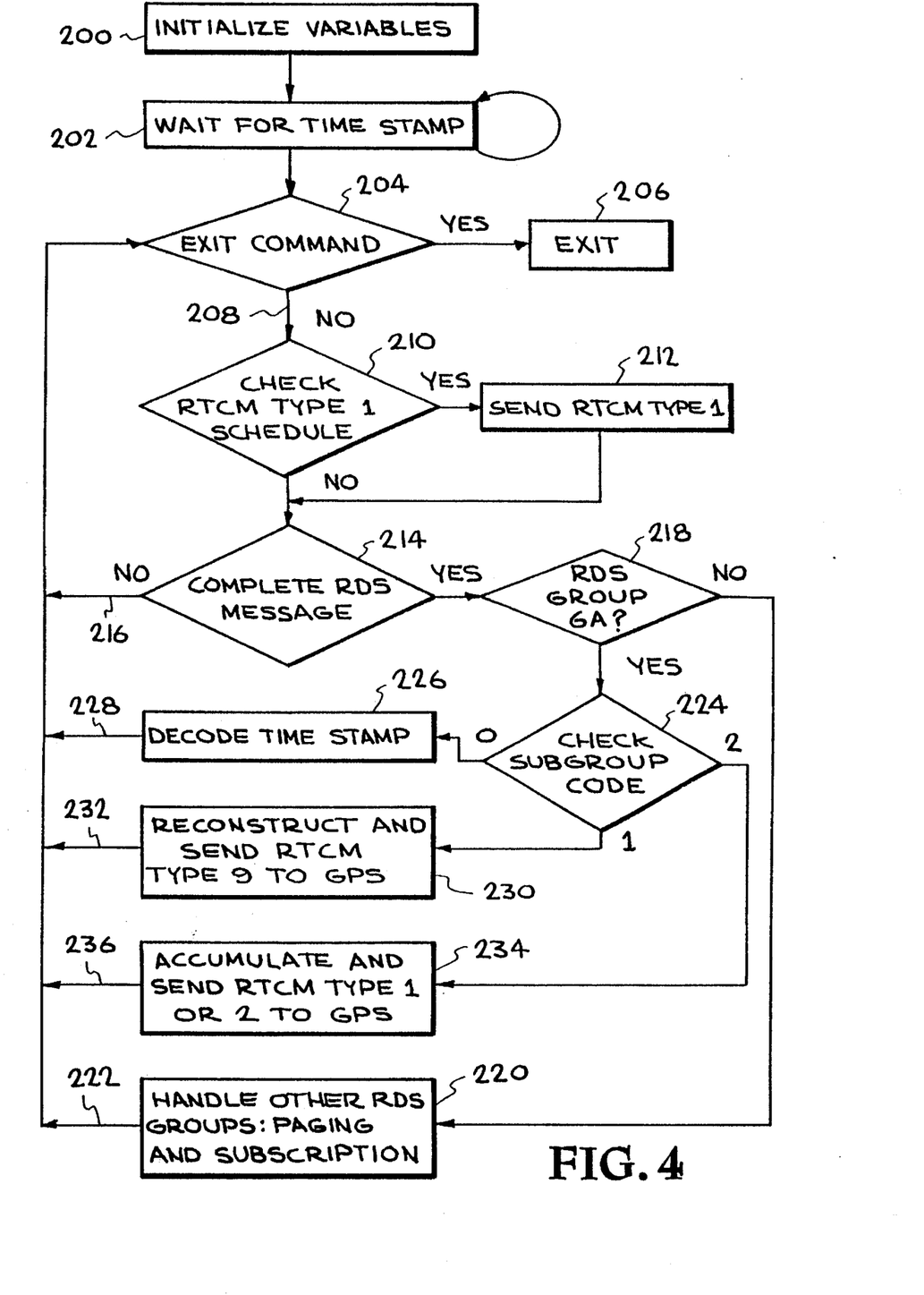
FIG. 4 is a flow chart showing the operation for a differential corrections receiver according to the invention.

FIG. 4 is a flow chart showing the program operation for a differential corrections receiver. This operation provides for conversion of RDS-formatted information to RTCM-104-formatted information.

The program starts by initializing variables, as indicated in process block 200. The program proceeds in block 102 to get GPS time from the GPS system. Block 202 indicates that the routine waits for an appropriate time stamp to set the receiver clock at the appropriate minute. The time stamp is sent as a RDS 6A group.

A main control loop starts with a decision block 204 which scans for an exit command. If such a command is received, the system proceeds to an exit function, as indicated by a block 206. If no such command is received, the system continues on a path 208 to a decision block 210.

A user can schedule transmission of Type 1 messages at certain times. The decision block 210 checks a RTCM Type 1 message schedule. If a Type 1 message is scheduled, the routine proceeds to a block 212 which sends a RTCM Type 1 message. If a RTCM Type 1 message is not scheduled, the routine continues to a decision block 214, which tests whether a complete RDS message Group of four Blocks is available. If not the program loops back on a path 216 to decision block 204. If a complete RDS message is available, the program proceeds to a decision block 218, which tests whether a RDS Group 6A has been sent.

If the complete RDS message is not a RDS Group 6A type, the routine proceeds to a block 220, which indicates that the program handles other RDS group messages, such as paging and subscribers' subscription messages, and returns on a path 222 to the decision block 204.

If the complete RDS message is a RDS Group 6A type, the routine proceeds to a decision block 224 which tests the subgroup code of the Group 6A message. If the code is 0, a time stamp is decoded, as indicated by the block 226, and the routine returns on a path 228 to the decision block 204. If the code is 1, a RTCM Type 9 is sent to the GPS receiver, as indicated by the block 230, and the routine returns on a path 232 to the decision block 204. If the code is 2, a RTCM Type 1 or 2 message is sent to the GPS receiver, as indicated by the block 234, and the routine returns on a path 236 to the decision block 204.

METHOD OF THE INVENTION

The following steps are computed in block 158 of FIG. 3.

When a GPS receiver/processor receives GPS signals from K GPS satellites, consecutively numbered $k=1, 2, \ldots, K (K \geq 2)$, the time or position determined from the signal received from each satellite will have an associated error, referred to here as a "range error" for ease of reference. The "range" itself is received as a sequence of values with associated range errors $\{e_{i,k}\}_{i,k}$, where i refers to a sampling time $t=t_i$ and k refers to the satellite number. A range error at time $t=t_i$ also has associated first derivative (velocity) and second derivative (acceleration) of the error with time, denoted $v_{i,k}$ and $a_{i,k}$, respectively, and representing measured or calculated rates of change of the quantity $e_{i,k}$ with time t. In any time interval, it will often be impossible to broadcast all the present time and/or ephemeris information received from each satellite $k=1, 2, \ldots, K$. Given the three sequences of values $\{e_{i,k}\}_k$ and $\{v_{i,k}\}_k$ an d $\{a_{i,k}\}_k$ at any time $t=t_i$, a choice must be made as to which satellite information to broadcast in a given time interval $t_i \leq t < t_{i+1}$, based upon the knowledge of these three sequences of values.

In a first embodiment of the invention, the range error for satellite number k at a selected time t in a time interval $t_i < t < t_{i+1}$ is assumed to be approximately given by $$e_{i,k}(t) = e_{i,k}(t_i) + (t-t_i)v_{i,k}(t_i) \quad (t_i < t < t_{i+1}), \tag{1}$$

and information for satellite number $k=k0$ is broadcast, where k0 is the satellite number for which $$|a_{i,k0}| = \max_{1 \leq k \leq K}\{|a_{i,k}|\}. \tag{2}$$

The accelerations can also be ranked in descending order and the highest ranked is sent first.

In a second embodiment of the invention, a first range error for satellite number k at the selected time t is assumed to be as given in Eq. (1), and a second range error for satellite number k is determined by the relation $$e_{i,k}'(t) = e_{i-1,k}(t_{i-1}) + (t-t_{i-1})v_{i-1,k}(t_{i-1}) \quad (t_i < t < t_{i+1}). \tag{3}$$

For the selected time t a difference $$e_{i,k} = e_{i,k}(t) - e_{i,k}'(t) \tag{4}$$

is formed, and the magnitude $|e_{i,k}|$ is compared with a selected threshold $e>0$. All satellite numbers k for which $$|e_{i,k}| \geq e \tag{5}$$

have the present range information transmitted in the time interval $t_i < t < t_{i+1}$.

In a third embodiment of the invention, the magnitudes $|e_{i,k}|$ are compared, for i fixed, and rearranged in descending order according as $$|e_{i,k1}| \geq |e_{i,k2}| \geq |e_{i,k3}| \geq \ldots \geq |e_{i,kK}|. \tag{6}$$

Equation (6) is then used to assign priorities: the present range information for satellite number $k=k1$ is first transmitted; then the present range information for satellite number $k=k2$ is first transmitted; then the present range information for satellite number $k=k3$ is first transmitted; and so on, until insufficient time remains within the time interval $t_i < t < t_{i+1}$ to transmit present range information on additional satellites. The second and third embodiments can be used together to determine a transmission priority among the satellites whose associated error $e_{i,k}$ satisfies Eq. (5).

In a fourth embodiment range errors are ranked in descending order and the highest ranked satellite's data is sent first.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular us contemplated. It is intended that the scope of the invention be defined by the Claims appended hereto and their equivalents.

We claim:

1. A system for broadcasting differential correction signals for a global positioning system (GPS) which includes a plurality of orbiting satellites, comprising:

means for providing differential correction signals in a first standard format for various ones of a plurality of satellites;

means for converting said differential corrections signals in the first standard format to signals in a second standard format;

means for prioritizing the broadcast transmission time of the signals in the second standard format;

transmitter means for broadcasting a signal modulated by the prioritized signals in the second standard format;

receiver means for receiving and demodulating the broadcast signal modulated by the prioritized signals in the second standard format;

means for reconverting the broadcast prioritized signals in the second standard format to provide differential correction signals in the first standard format.

2. The system of claim 1 wherein the differential correction signals include range error correction signals and range rate error correction information.

3. The system of claim 2 wherein the means for prioritizing the transmission time of the signals in the second standard format includes means for prioritizing according to the maximum range acceleration rate for the various satellites.

4. The system of claim 2 wherein the means for prioritizing the transmission time of the signals in the second standard format includes means for prioritizing according to the range acceleration rate for the various satellites exceeding a predetermined absolute value.

5. The system of claim 2 wherein the means for prioritizing the transmission time of the signals in the second standard format includes means for prioritizing according to range error correction signals exceeding a predetermined absolute value.

6. The system of claim 2 wherein the means for prioritizing the transmission time of the signals in the second standard format includes means for prioritizing according to the range error corrections signals for the various satellites.

7. The system of claim 1 wherein the first standard format is a Radio Technical Commission for Maritime Services (RTCM) standard format for differential Navstar GPS services.

8. The system of claim 1 wherein the second standard format is a Radio Data Service (RDS) standard format.

9. The system of claim 1 wherein the transmitter means is an FM broadcast transmitter and wherein the receiver means is a FM receiver.

10. A system for broadcast transmitting differential correction signals for global positioning system GPS which includes a plurality of orbiting satellites, comprising:

means for providing differential correction signals in a first standard format for various ones of a plurality of satellites;

means for converting said differential corrections signals in the first standard format to guide in a second standard format;

means for prioritizing the transmission time of the signals in the second standard format;

transmission means for broadcasting a signal modulated by the prioritized signals in the second standard format.

11. The system of claim 10 wherein the differential correction signals include range error correction signals and range rate error correction information.

12. The system of claim 11 wherein the means for prioritizing the transmission time of the signals in the second standard format includes means for prioritizing according to the maximum range acceleration rate for the various satellites.

13. The system of claim 11 wherein the means for prioritizing the transmission time of the signals in the second standard format includes means for prioritizing according to the range acceleration rate for the various satellites exceeding a predetermined absolute value.

14. The system of claim 11 wherein the means for prioritizing the transmission time of the signals in the second standard format includes means for prioritizing according to range error correction signals exceeding a predetermined absolute value.

15. The system of claim 11 wherein the means for prioritizing the transmission time of the signals in the second standard format includes means for prioritizing according to the range error corrections signals for the various satellites.

16. The system of claim 10 wherein the first standard format is a Radio Technical Commission for Maritime Services (RTCM) standard format for differential Navstar GPS services.

17. The system of claim 10 wherein the second standard format is a Radio Data Service (RDS) standard format.

18. The system of claim 10 wherein the transmitter means is an FM broadcast transmitter and wherein the receiver means is a FM receiver.

19. A method for receiving information from a plurality of Global Positioning System (GPS) satellites and for rebroadcasting a selected portion of this information for receipt by selected recipients, the method comprising the steps of:

providing a GPS receiver/processor to receive GPS signals from K GPS satellites, consecutively numbered $k=1, 2, \ldots, K (K \geq 2)$;

providing a transmitter connected to the GPS receiver/processor to rebroadcast selected GPS signals in each of a sequence of time intervals given by $t_i < t < t_{i+1}$, for receipt by selected recipients; and using the transmitter to rebroadcast selected GPS signal range information received from satellite number k0 at a selected time t in the time interval $t_i < t < t_{i+1}$, where satellite number k=k0 is chosen according to a criterion based upon the range errors $e_{i,k}$ and the range error rates $v_{i,k}$ and range error accelerations $a_{i,k}$ at the sequence of times $\{t_i\}_i$ for each of the satellites $k=1, 2, \ldots, K$.

20. The method of claim 19, wherein said criterion for choice of said satellite number k0 is $$|a_{i,k0}| = \max_{1 \leq k \leq K} \{|a_{i,k}|\}.$$

21. The method of claim 19, wherein said criterion for choice of said satellite number k0 is to rank the acceleration values in descending order and transmit satellite information in that order.

22. The method of claim 19, wherein said criterion for choice of said satellite number k0 is determined as follows:

determining a first range error for satellite number k at a selected time t in said time interval $t_i < t < t_{i+1}$ by the relation $$e_{i,k}(t) = e_{i,k}(t_i) + (t - t_i) v_{i,k}(t_i);$$

determining a second range error for satellite number k at the selected time t by the relation $$e_{i,k}'(t) = e_{i-1,k} + (t - t_{i-1})(v_{i-1,k} \ (t_i < t < t_{i+1});$$

for the selected time t, forming a difference $$e_{i,k} = e_{i,k}(t) - e_{i,k}'(t)$$

and comparing the magnitude $|e_{i,k}|$ with a selected threshold $e > 0$; and transmitting said present range information for all satellite numbers k for which $|e_{i,k}| \geq e$.

23. The method of claim 19, wherein said criterion for choice of said satellite number k0 is determined as follows:

determining a first range error for satellite number k at a selected time t in a time interval $t_i < t < t_{i+1}$ i by the relation $e_{i,k}(t) = e_{i,k}(t_i) + (t-t_i)v_{i,k}(t_i);$ determining a second range error for satellite number k at the selected time t by the relation $e_{i,k}'(t) = e_{i-1,k}(t_{i-1}) + (t-t_{i-1})v_{i-1,k}(t_{i-1})$ $(t_i < t < t_{i+1});$ for the selected time t, forming a difference $e_{i,k} = e_{i,k}(t) - e_{i,k}'(t)$ and comparing the magnitudes $|e_{i,k}|$;

rearranging the magnitudes $|e_{i,k}|$, fixed, in descending order as a sequence $|e_{i,k1}| \geq |e_{i,k2}| \geq |e_{i,k3}| \geq \ldots \geq |e_{i,kK}|;$ and for at least one pair of consecutive integers m and m+1 ($1 \leq m \leq K-1$), transmitting said present range information for satellite number km before transmitting said present range information for satellite k=k(m+1).

24. A system for broadcasting differential correction signals for a global positioning system (GPS) which includes a plurality of orbiting satellites, comprising:

means for providing differential correction signals in a first standard format for various ones of a plurality of satellites, wherein the differential correction signals include range error correction signals and range rate error correction information;

means for converting said differential correction signals in the first standard format to signals in a second standard format;

means for prioritizing the broadcast transmission time of the signals in the second standard format, wherein the means for prioritizing the transmission time of the signals in the second standard format includes means for prioritizing according to the maximum range acceleration rate for the various satellites;

transmitter means for broadcasting a signal modulated by the prioritized signals in the second standard format;

receiver means for receiving and demodulating the broadcast signal modulated by the prioritized signals in the second standard format;

means for reconverting the broadcast prioritized signals in the second standard format to provide differential correction signals in the first standard format.

25. A system for broadcasting differential correction signals for a global positioning system (GPS) which includes a plurality of orbiting satellites, comprising:

means for providing differential correction signals in a first standard format for various ones of a plurality of satellites, wherein the differential correction signals include range error correction signals and range rate error correction information;

means for converting said differential correction signals in the first standard format to signals in a second standard format;

means for prioritizing the broadcast transmission time of the signals in the second standard format, wherein the means for prioritizing the transmission time of the signals in the second standard format includes means for prioritizing according to the range acceleration rate for the various satellites exceeding a predetermined absolute value;

transmitter means for broadcasting a signal modulated by the prioritized signals in the second standard format;

receiver means for receiving and demodulating the broadcast signal modulated by the prioritized signals in the second standard format;

means for reconverting the broadcast prioritized signals in the second standard format to provide differential correction signals in the first standard format.

26. A system for broadcasting differential correction signals for a global positioning system (GPS) which includes a plurality of orbiting satellites, comprising:

means for providing differential correction signals in a first standard format for various ones of a plurality of satellites, wherein the differential correction signals include range error correction signals and range rate error correction information;

means for converting said differential correction signals in the first standard format to signals in a second standard format;

means for prioritizing the broadcast transmission time of the signals in the second standard format, wherein the means for prioritizing the transmission time of the signals in the second standard format includes means for prioritizing according to range error correction signals exceeding a predetermined absolute value;

transmitter means for broadcasting a signal modulated by the prioritized signals in the second standard format;

receiver means for receiving and demodulating the broadcast signal modulated by the prioritized signals in the second standard format;

means for reconverting the broadcast prioritized signals in the second standard format to provide differential correction signals in the first standard format.

27. A system for broadcasting differential correction signals for a global positioning system (GPS) which includes a plurality of orbiting satellites, comprising:

means for providing differential correction signals in a first standard format for various ones of a plurality of satellites, wherein the differential correction signals include range error correction signals and range rate error correction information;

means for converting said differential correction signals in the first standard format to signals in a second standard format;

means for prioritizing the broadcast transmission time of the signals in the second standard format, wherein the means for prioritizing the transmission time of the signals in the second standard format includes means for prioritizing according to the range error corrections signals for the various satellites;

transmitter means for broadcasting a signal modulated by the prioritized signals in the second standard format;

receiver means for receiving and demodulating the broadcast signal modulated by the prioritized signals in the second standard format;

means for reconverting the broadcast prioritized signals in the second standard format to provide differential correction signals in the first standard format.

28. A system for broadcasting differential correction signals for a global positioning system (GPS) which includes a plurality of orbiting satellites, comprising:

means for providing differential correction signals in a first standard format for various ones of a plurality of satellites;

means for converting said differential correction signals in the first standard format to signals in a second standard format, wherein the second standard format is a Radio Data Service (RDS) standard format;

means for prioritizing the broadcast transmission time of the signals in the second standard format;

transmitter means for broadcasting a signal modulated by the prioritized signals in the second standard format;

receiver means for receiving and demodulating the broadcast signal modulated by the prioritized signals in the second standard format;

means for reconverting the broadcast prioritized signals in the second standard format to provide differential correction signals in the first standard format.

29. A system for broadcast transmitting differential correction signals for a global positioning system GPS which includes a plurality of orbiting satellites, comprising:

means for providing differential correction signals in a first standard format for various ones of a plurality of satellites;

means for converting said differential correction signals in the first standard format to provide signals in a second standard format, wherein the differential correction signals include range error correction signals and range rate error correction information;

means for prioritizing the broadcast transmission time of the signals in the second standard format, wherein the means for prioritizing the broadcast transmission time of the signals in the second standard format includes means for prioritizing according to the maximum range acceleration rate for the various satellites;

transmitter means for broadcasting a signal modulated by the prioritized signals in the second standard format.

30. A system for broadcast transmitting differential correction signals for a global positioning system GPS which includes a plurality of orbiting satellites, comprising:

means for providing differential correction signals in a first standard format for various ones of a plurality of satellites;

means for converting said differential correction signals in the first standard format to provide signals in a second standard format, wherein the differential correction signals include range error correction signals and range rate error correction information;

means for prioritizing the transmission time of the signals in the second standard format, wherein the means for prioritizing the transmission time of the signals in the second standard format includes means for prioritizing according to the range acceleration rate for the various satellites exceeding a predetermined absolute value;

transmitter means for broadcasting a signal modulated by the prioritized signals in the second standard format.

31. A system for broadcast transmitting differential correction signals for a global positioning system GPS which includes a plurality of orbiting satellites, comprising:

means for providing differential correction signals in a first standard format for various ones of a plurality of satellites;

means for converting said differential correction signals in the first standard format to provide signals in a second standard format, wherein the differential correction signals include range error correction signals and range rate error correction information;

means for prioritizing the transmission time of the signals in the second standard format, wherein the means for prioritizing the transmission time of the signals in the second standard format includes means for prioritizing according to range error correction signals exceeding a predetermined absolute value;

transmitter means for broadcasting a signal modulated by the prioritized signals in the second standard format.

32. A system for broadcast transmitting differential correction signals for a global positioning system GPS which includes a plurality of orbiting satellites, comprising:

means for providing differential correction signals in a first standard format for various ones of a plurality of satellites;

means for converting said differential correction signals in the first standard format to provide signals in a second standard format, wherein the differential correction signals include range error correction signals and range rate error correction information;

means for prioritizing the transmission time of the signals in the second standard format, wherein the means for prioritizing the transmission time of the signals in the second standard format includes means for prioritizing according to the range error corrections signals for the various satellites;

transmitter means for broadcasting a signal modulated by the prioritized signals in the second standard format.

33. A system for broadcast transmitting differential correction signals for a global positioning system GPS which includes a plurality of orbiting satellites, comprising:

means for providing differential correction signals in a first standard format for various ones of a plurality of satellites;

means for converting said differential correction signals in the first standard format to provide signals in a second standard format, wherein the second standard format is a Radio Data Service (RDS) standard format;

means for prioritizing the transmission time of the signals in the second standard format;

transmitter means for broadcasting a signal modulated by the prioritized signals in the second standard format.

* * * * *